(12) United States Patent
Huber et al.

(10) Patent No.: US 6,362,576 B1
(45) Date of Patent: Mar. 26, 2002

(54) CIRCUIT ARRANGEMENT FOR IGNITING A LAMP

(75) Inventors: Andreas Huber, Maisach; Peter Niedermeier; Walter Limmer, both of München, all of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/572,580

(22) Filed: May 17, 2000

(30) Foreign Application Priority Data

May 20, 1999 (DE) .......................................... 199 23 263

(51) Int. Cl.[7] .............................................. H05B 37/00
(52) U.S. Cl. ........................ 315/289; 315/290; 315/219; 315/276
(58) Field of Search ................................ 315/289, 290, 315/209 CD, 291, 77, 227 R, 219, 276, 244

(56) References Cited

U.S. PATENT DOCUMENTS

| 4,342,948 | A | * | 8/1982 | Samuels ..................... 315/290 |
|---|---|---|---|---|
| 4,403,173 | A | * | 9/1983 | Mayer ......................... 315/289 |
| 4,782,242 | A | * | 11/1988 | Kovacs ........................ 307/106 |
| 4,893,061 | A | * | 1/1990 | Linssen .................. 315/227 R |
| 5,517,088 | A | * | 5/1996 | Blom .......................... 315/289 |
| 5,831,394 | A | * | 11/1998 | Huber et al. ................. 315/224 |
| 5,892,332 | A | * | 4/1999 | Drews et al. ......... 315/209 CD |
| 6,008,591 | A | * | 12/1999 | Huber et al. ................. 315/219 |

FOREIGN PATENT DOCUMENTS

DE    298 02 174    4/1998

* cited by examiner

Primary Examiner—Haissa Philogene
(74) Attorney, Agent, or Firm—Carlo S. Bessone

(57) ABSTRACT

A circuit arrangement for igniting a lamp, in particular a high-pressure discharge lamp. The lamp has an ignition transformer with a primary side and a secondary side, the secondary side is connected to the lamp which is to be ignited, and the primary side is connected to an ignition switch. The ignition switch is controlled for actively disconnecting a current flowing through the primary side of the ignition transformer.

11 Claims, 4 Drawing Sheets

CIRCUIT ARRANGEMENT FOR IGNITING A LAMP

BACKGROUND OF THE INVENTION

The present invention relates to a circuit arrangement for igniting a lamp, in particular a high-pressure discharge lamp, having an ignition transformer which has a primary side and a secondary side, the secondary side being connectable to the lamp which is to be ignited, and the primary side being connected to an ignition switch.

To illustrate the problem on which the invention is based, FIG. 1 shows such a circuit arrangement, as is known from the prior art. A capacitor C1 is charged from a DC voltage source $U_G$ via a resistor R1. The capacitor C1 is then discharged, by shorting a spark gap FS, via the primary side L1 of the ignition transformer TR, until it is empty. As an alternative to the spark gap, other self-triggering circuit breakers, for example SIDACs, or triggerable circuit breakers, for example thyristors or triacs, are also used in this case. The large current flowing through the primary L1 of the ignition transformer TR is transferred to the secondary L2 of the ignition transformer and causes the lamp LA to be ignited there. The capacitor CL shown in FIG. 1 allows for the capacitance between the two lamp wires, which is usually between 20 and 200 pF, depending on the distance between the ignition circuit and the lamp LA. The field in which such circuit arrangements are used includes high-pressure discharge lamps, which, in respect of their diverse applications, can be regarded as a mass-produced product.

The object of the present invention is to refine a circuit arrangement of the type mentioned in the introduction such that production costs and complexity are lower than for the circuit arrangement known from the prior art.

SUMMARY OF THE INVENTION

To achieve this object, the present invention provides that the ignition switch can be controlled for actively disconnecting a current flowing through the primary side of the ignition transformer.

The solution according to the invention is based on the knowledge that, provided that the ignition switch can be controlled for actively disconnecting a current flowing through the primary side of the ignition transformer, the store used for the ignition energy can also be a charge store storing more charge than is necessary for the ignition process. In a particularly advantageous embodiment, to provide the ignition energy, the primary side of the ignition transformer is therefore connected to any desired DC voltage source, which is provided anyway in the circuit, for example to the intermediate circuit capacitor of the circuit arrangement for operating the lamp. This solution allows the components R1 and C1 shown in FIG. 1 to be dispensed with. As a result of the charging time constant determined by R1 and C1 disappearing, the invention provides the option of producing, in principle, ignition pulses of the same amplitude which follow one another at any desired rate.

The variable turned-on duration of the ignition switch also permits the ignition pulse amplitude to be influenced. This effect can advantageously be used to compensate for component tolerances and, in particular, the influence of the output capacitance in such a way that the amplitude of the ignition voltage produced remains virtually constant. The result of this is very reliable lamp ignition.

In one advantageous implementation, the primary of the ignition transformer is arranged between the intermediate circuit capacitor and the ignition switch.

A component, particularly an inductor, which limits the rise in current and is arranged in the current path on the primary side and/or the secondary side of the ignition transformer is used to prevent an undesirably high current from flowing as soon as the ignition switch has been turned on. This component acts in addition to the leakage inductance of the ignition transformer, which is always present anyway, but allows other degrees of freedom when designing the ignition transformer.

However, the solution according to the invention also provides the basis for taking into account other demands on an ignition circuit: considering the basic circuit (shown in FIG. 1) for a circuit arrangement for igniting a lamp, this cannot, for many lamps, in particular high-pressure discharge lamps, always produce ignition pulses causing the lamps to be ignited reliably, even if the individual circuit parameters are optimized. The specification for an ignition pulse is frequently defined in standards, for example in the American standard ANSI M98, which defines the electrical data for operating a "70 W Single Ended HID Lamp". For a load capacitance CL of 20 pF, the minimum ignition pulse level should be 3 kV, the maximum ignition pulse level should be 4 kV and the minimum pulse width should be 1 $\mu$s @ 2.7 kV. The minimum pulse repetition rate should be 240 Hz.

Using circuit arrangements based on the basic circuit shown in FIG. 1, an ignition pulse satisfying these ANSI M98 criteria could not be produced within the framework of a sensible physical size for the ignition transformer or without severely impairing the normal operation of the lamp, that is to say operation after ignition.

In this case, it should be taken into account that contradictory conditions arise when designing the ignition transformer, particularly the secondary side: first, for normal operation, that is to say after ignition of the lamp, L2 needs to be proportioned such that the internal resistance is low, and, secondly, for ignition, L2 needs to be proportioned such that it allows a wide ignition pulse to be produced. Whereas the first condition requires an L2 with few windings, an L2 with a large number of windings is necessary for the second condition. For these different demands, it is not possible to find a satisfactory solution on the basis of the basic circuit shown in FIG. 1.

The situation is different with a particularly advantageous embodiment of the invention: if provision is made for a capacitor to act in parallel with the secondary of the ignition transformer, the capacitor and the secondary of the ignition transformer being able to form a resonant circuit having a predetermined resonant frequency and a predetermined maximum peak voltage, then a sinusoidal ignition pulse can be generated which can be used to satisfy the electrical demands on the ignition pulse, particularly in terms of its width. In this instance, L2 can have few windings, for low resistance during operation of the lamp, that is to say after ignition. The load capacitance influences can also be drastically reduced as a result.

When implemented, the capacitor acting in parallel with the secondary can be a capacitor connected in parallel with the secondary of the ignition transformer, or a capacitor connected in parallel with the connection terminals of the lamp. The latter variant is suitable if there is an output filter capacitor at the output of the lamp current generator which is usually present. Since the capacitance value of the output filter capacitor is much higher than the capacitance value of the capacitor connected in parallel with the connection terminals of the lamp, a voltage change on the output filter capacitor during pulse generation remains small. The capacitor connected in parallel with the connection terminals of the lamp thus acts as if it were arranged in parallel with the secondary of the ignition transformer. The advantage of this implementation produces an additional filtering action on the current in normal operation and consequently results in more favorable RFI values. The ignition pulse remains largely unaffected by the arrangement of the capacitor acting in parallel with the secondary of the ignition transformer.

Whereas the circuit arrangement shown in FIG. 1 can be used to produce only a cosinusoidal ignition pulse, the particularly preferred embodiment of the present invention can now be used to produce a sinusoidal ignition pulse, which can be used to satisfy the requirement regarding ignition pulse width, for example 1 µs @ 2.7 kV in accordance with ANSI M98, see above, much more easily.

So that the energy stored in the ignition circuit can freewheel on the primary side when the ignition switch has been turned off, the invention proposes that the ignition switch be connected to the intermediate circuit capacitor, on the one hand via the primary side of the ignition transformer and on the other hand via a clamp circuit. This is particularly advantageous to prevent the ignition switch from being destroyed, for example if the lamp is faulty and hence ignition does not take place.

In a first embodiment, the clamp circuit comprises a diode and a zener diode in reverse-connected series with one another. They ensure that the voltage on the ignition switch is limited and that the ignition transformer is demagnetized until the next ignition pulse.

Alternatively, the clamp circuit can comprise a diode arranged in series with a parallel circuit comprising a capacitor and a nonreactive resistor. The advantage of such a clamp circuit is that the pulse energy can be stored in the capacitor "quickly" and can be reduced "slowly" by the nonreactive resistor until the next ignition pulse.

However, another provision may be that, in place of the aforementioned clamp circuits, the main electrode of the ignition switch is connected to the DC voltage source, preferably the intermediate circuit capacitor, on the one hand via the primary side of the ignition transformer, and on the other hand via a series circuit comprising a capacitor and a first diode, and the reference electrode of the ignition switch is connected to the junction point between the capacitor and the first diode via the series circuit comprising a second diode and an inductor. This circuit measure is known from DE 298 02 174.9, the content of whose disclosure is thus incorporated in the present application by way of reference. It allows complete feedback of the energy stored in the ignition transformer, which allows very high ignition pulse repetition rates to be produced with practically no losses. In a modification of this circuit measure, a third diode is arranged between the intermediate circuit capacitor and the junction point between the inductor and the second diode.

In a particularly advantageous embodiment, the ignition transformer has an iron-powder core. This allows a very low secondary-side nonreactive resistance to be achieved for the ignition transformer, which means that losses during continuous operation of the circuit arrangement, that is to say after ignition, can be kept at a low level. The iron-powder core also affords the advantage that relatively high-frequency parasitic oscillation components in the ignition pulse are greatly attenuated. The result is that an almost ideally sinusoidal ignition pulse without relatively high-frequency oscillation components can be produced.

Other advantageous embodiments of the invention can be found in the subclaims.

BRIEF DESCRIPTION OF THE DRAWINGS

Illustrative embodiments of the invention are described in more detail below with reference to the appended drawings, in which.

DETAILED DESCRIPTION OF THE PREFERRED EMBODIMENTS

Figure 2:
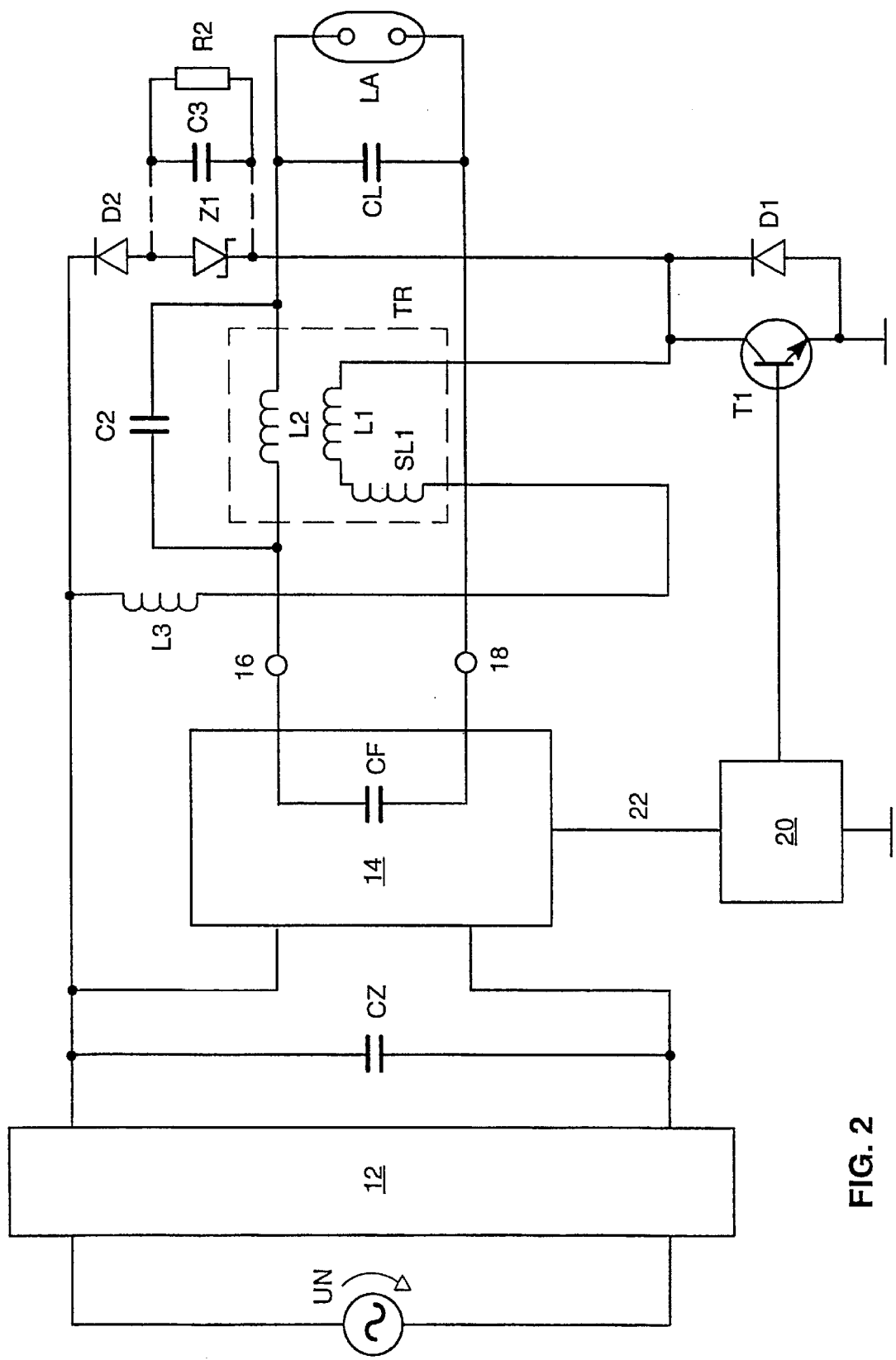
FIG. 2 shows a schematic illustration of a basic circuit diagram of a circuit arrangement in accordance with a first embodiment of the present invention.

FIG. 2 is a schematic illustration of a circuit arrangement for igniting and operating a lamp LA, in particular a high-pressure discharge lamp. The input of a rectifier 12 is connected to a mains voltage source UN, while its output is connected to an intermediate circuit capacitor CZ. The intermediate circuit capacitor CZ provides a DC voltage for the components arranged to the right thereof in the circuit arrangement. A lamp current generator 14 is arranged in parallel with the intermediate circuit capacitor CZ, and an output filter capacitor CF is connected in parallel with the output terminals 16, 18 of said lamp current generator 14. One end of the secondary L2 of an ignition transformer TR is connected to the output terminal 16. The lamp LA which is igniting is arranged between the second end of the secondary L2 of the ignition transformer TR and the output terminal 18 of the lamp current generator. In parallel with the lamp LA, a capacitor CL allows for the capacitance actually originating from the lamp wires. A capacitor C2 is arranged in parallel with the secondary L2 of the ignition transformer TR. The series circuit comprising the primary L1 and the primary-side leakage inductance SL1 of the ignition transformer TR is connected, on the one hand, to the intermediate circuit capacitor CZ via an inductor L3, and, on the other hand, to the main electrode of a switch T1. A freewheeling diode D1 is reverse-connected in parallel between the main electrode and the reference electrode of the switch T1. The control electrode of the switch T1 is connected to an ignition controller 20, which, for its part, is connected to the lamp current generator 14 via a line 22. The line 22 permits a signal to flow from the lamp current generator 14 to the ignition controller 20, and vice-versa. The reference electrode of the switch T1 is connected to the intermediate circuit capacitor CZ by means of a reverse-connected series arrangement comprising a zener diode Z1 and a diode D2. An alternative to the zener diode Z1 is shown in dashes, said alternative comprising a capacitor C3 and a nonreactive resistor R2.

The circuit arrangement shown in FIG. 2 operates as follows for igniting the lamp LA: On an enable pulse for the ignition controller 20 of defined duration, which is applied to the control electrode of the switch T1, said switch turns on, also for a defined duration, that is to say it permits a current to flow in the main current's direction of flow from the main electrode to the reference electrode over a particular period of time. The switch T1 can, as an example, be an IGBT power transistor capable of interrupting even high ignition currents. Accordingly, for the period for which the switch T1 is turned on, a primary-side ignition current flows—driven by the intermediate circuit capacitor CZ, which acts as a DC voltage source—through the series circuit comprising L3, SL1, L1 and T1 to ground. The inductor L3 interacts with the leakage inductance SL1 and limits the rise in the primary-side ignition current as soon as the switch T1 has turned on. Without the capacitor C2, this would nevertheless result in an almost cosinusoidal curve for the ignition current through the secondary L2 of the ignition transformer TR. However, since, as already mentioned above, an ignition pulse which is as sinusoidal as possible is desired for the ignition pulse width, a capacitor C2 is connected in parallel with the secondary L2 of the ignition transformer TR. With suitable proportioning, this allows a resonant circuit to be produced at a predetermined frequency and with a predetermined peak voltage, and consequently a sinusoidal, relatively wide ignition pulse.

So that the energy stored on the primary side can freewheel, particularly if ignition has not taken place on account of a faulty lamp LA, for example, a clamp circuit comprising the diode D2 and the zener diode Z1 is provided. It is used to limit the voltage on the switch T1 and to demagnetize the ignition transformer until the next ignition pulse. As an alternative to this, the clamp circuit can also be produced from the diode D2 connected in series with the parallel circuit comprising a capacitor C3 and a nonreactive resistor R2. The capacitor C3 is used for quickly storing the pulse energy, whereas the resistor R2 permits slow reduction of the pulse energy until the next ignition pulse.

The ignition transformer TR preferably has an iron-powder core, for example an EF 32 iron-powder core from HARTU, made of material No. 629. The inductor L3 can be a yarnreel core inductor from FASTRON, this inductor having an unsaturated inductance of 100 $\mu$H.

Figure 3:
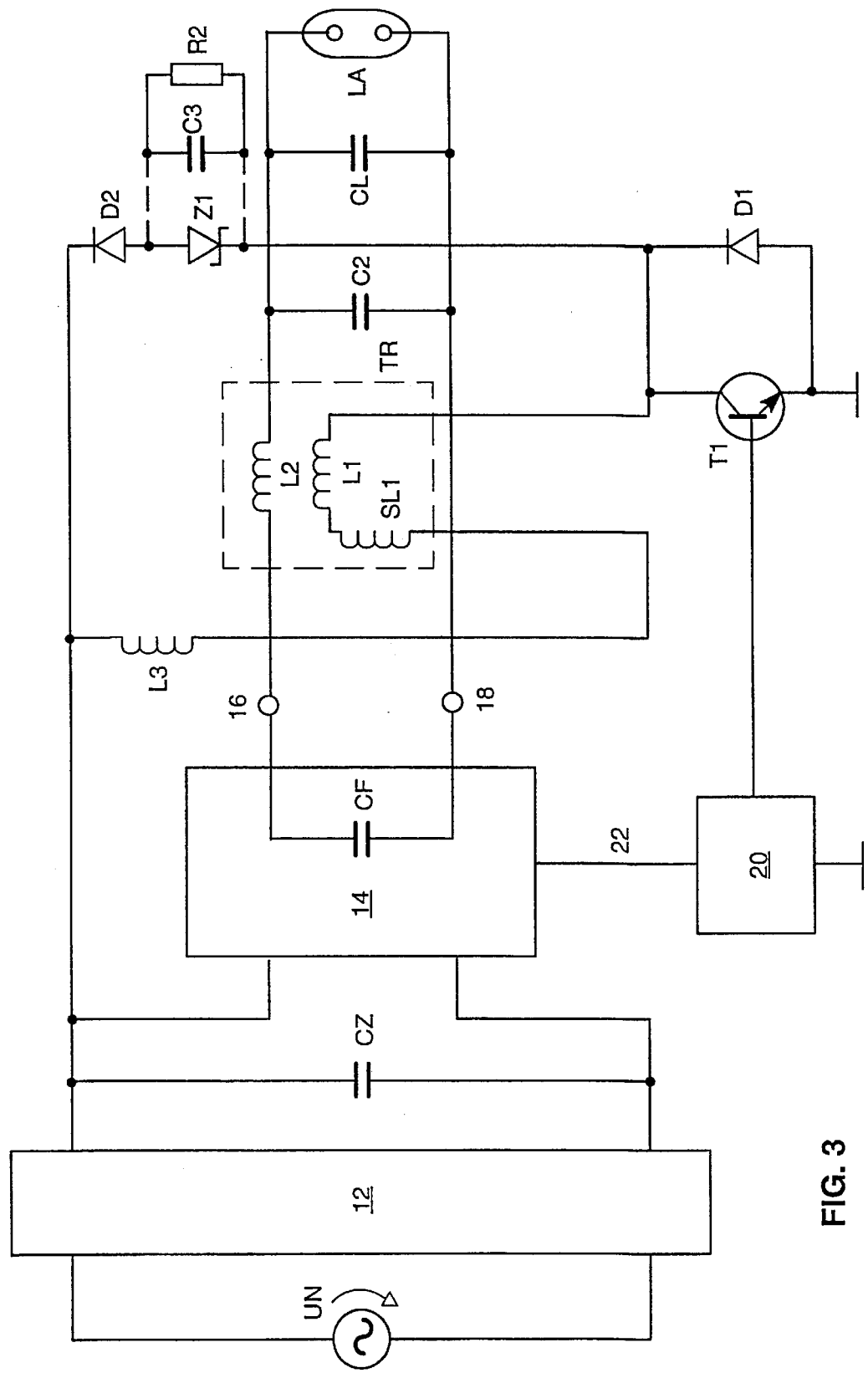
FIG. 3 shows a schematic illustration of a basic circuit diagram of a circuit arrangement in accordance with a second embodiment of the present invention.

In the alternative embodiment shown in FIG. 3, the resonant circuit capacitor C2 is connected in parallel with the lamp LA. In terms of the way it works when the lamp LA is ignited, this has no negative influence provided that the output filter capacitor CF is large, because the voltage change on the output filter capacitor CF then remains small during pulse generation. In the embodiment shown in FIG. 3, the same reference symbols as in FIG. 2 denote the same components and are therefore not described again. The embodiment shown in FIG. 3 affords the advantage that the secondary L2 of the ignition transformer TR and the resonant circuit capacitor C2 form an RF filter stage which further reduces RF components of the lamp current which have an interfering effect on low-frequency lamp operation. This also reduces the radiated interference from the circuit arrangement.

Figure 4:
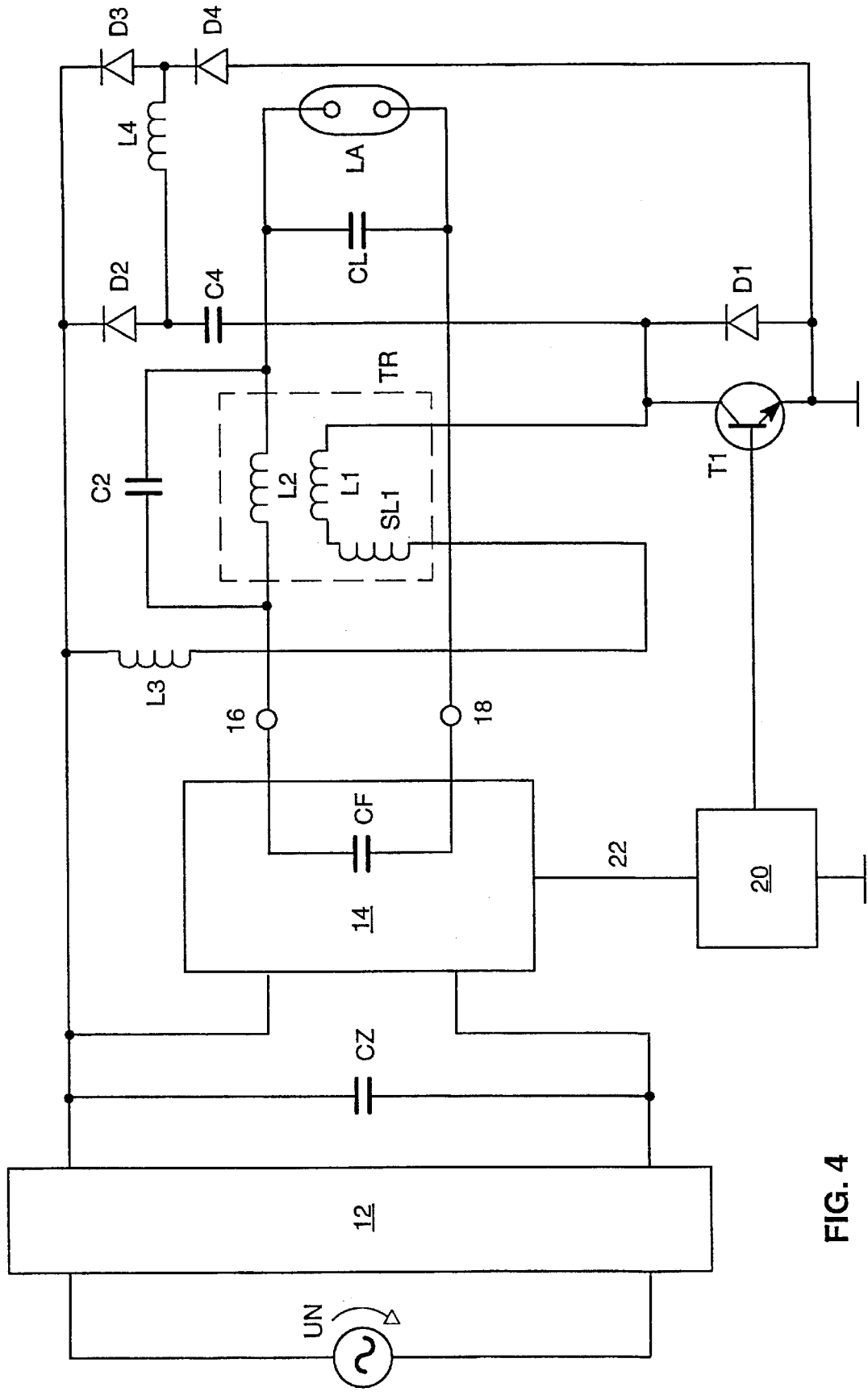
FIG. 4 shows a schematic illustration of a basic circuit diagram of a circuit arrangement in accordance with a third embodiment of the present invention.

In the circuit arrangement shown in FIG. 4, in which the same reference symbols as in FIG. 2 denote the same components, a circuit section comprising a diode D2, a capacitor C4, an inductor L4, a diode D3 and a diode D4 is provided instead of a clamp circuit, and the branch having the diode D3 can be dispensed with, if necessary. This expansion of the ignition circuit allows complete feedback of the energy stored in the ignition transformer, and the way it works is described in detail in DE 298 02 174.9. It allows very high ignition pulse repetition rates of up to several 10 kHz to be achieved with virtually no losses. In this arrangement, the resonant circuit capacitor C2 can also be arranged in parallel with the connections of the lamp LA, as in FIG. 3, without restricting operation.

Figure 1:
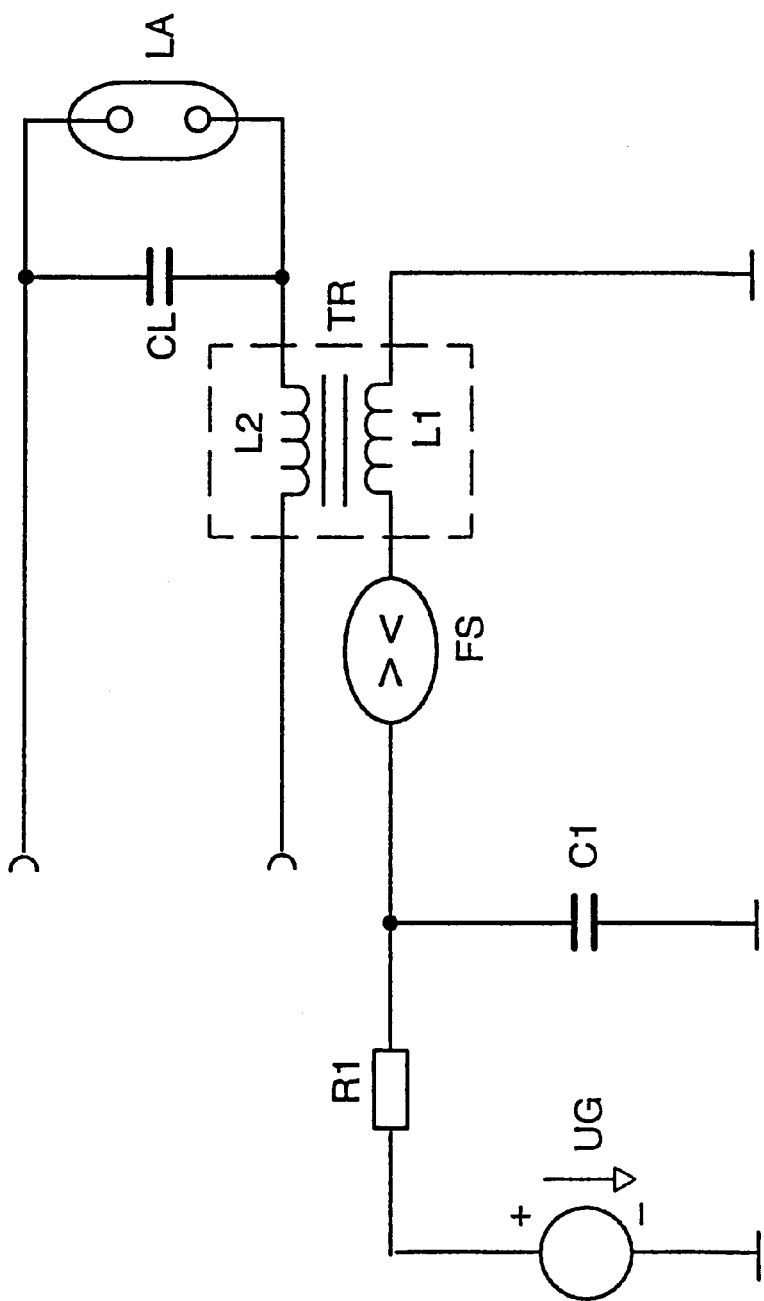
FIG. 1 shows a basic circuit, known from the prior art, for igniting a lamp.

The circuit concept according to the invention can be used to produce ignition pulses with an ignition pulse width which is greater by a factor of 10 than that in the circuit arrangement shown in FIG. 1. When re-igniting from hot, the lamps could be started again even after an approximately 30% shorter cooling period. The circuit concept according to the invention is also distinguished by good reproducibility of the ignition pulses.

We claim:

1. A circuit arrangement for igniting a lamp comprising:
   an ignition transformer having a primary side and a secondary side, the secondary side being connectable to the lamp which is to be ignited, and the primary side being connected to an ignition switch,
   the ignition switch actively disconnects current flowing through the primary side of the ignition transformer, and
   wherein a component that limits a rise in current is arranged in a current path on one of a primary side and a secondary side of the ignition transformer.

2. The circuit arrangement as claimed in claim 1, wherein the component that limits the rise in current is an inductor.

3. The circuit arrangement as claimed in claim 1, wherein the ignition transformer has an iron-powder core.

4. A circuit arrangement for igniting a lamp comprising:
   an ignition transformer having a primary side and a secondary side, the secondary side being connectable to the lamp which is to be ignited, and the primary side being connected to an ignition switch, wherein the ignition switch actively disconnects a current flowing through the primary side of the ignition transformer; and
   a capacitor in parallel with the secondary side of the ignition transformer, wherein the capacitor and the secondary side of the ignition transformer form a resonant circuit having one of a predetermined resonant frequency and a predetermined peak voltage.

5. The circuit arrangement as claimed in claim 4, wherein the capacitor is connected in parallel with connection terminals of the lamp.

6. A circuit arrangement for igniting a lamp comprising:
   an ignition transformer having a primary side and a secondary side, the secondary side being connectable to the lamp which is to be ignited, and the primary side being connected to an ignition switch, wherein the ignition switch actively disconnects current flowing through the primary side of the ignition transformer; and
   a capacitor in parallel with the secondary side of the ignition transformer, wherein the capacitor is proportioned such that an essentially sinusoidal ignition pulse is produced.

7. A circuit arrangement for igniting the lamp comprising:
   an ignition transformer having a primary side and a secondary side, the secondary side being connectable to the lamp which is to be ignited, the primary side being connected to an ignition switch, wherein the ignition switch actively disconnects current flowing through the primary side of the ignition transformer; and
   an intermediate circuit capacitor connected to the primary side of the ignition transformer, a first side of the ignition switch being connected to the intermediate circuit capacitor through the primary side of the ignition transformer, and a second side of the ignition switch being connected to the intermediate capacitor through a clamp circuit.

8. The circuit arrangement as claimed in claim 7, wherein the clamp circuit comprises a diode and a zener diode in reverse-connected series with one another.

9. The circuit arrangement as claimed in claim 7, wherein the clamp circuit comprising a diode in series with a parallel circuit comprising a capacitor and a non-reactive resistor.

10. The circuit arrangement as claimed in claim 7, wherein a first side of a main electrode of the ignition switch being connected to the intermediate circuit capacitor through the primary side of the ignition transformer and a second side of the main electrode of the ignition switch being connected to the intermediate circuit capacitor through a series circuit comprising a capacitor and a first diode, and wherein a reference electrode of the ignition switch is connected to a junction between the capacitor and the first diode through a series circuit comprising a second diode and an inductor.

11. The circuit arrangement as claimed in claim 10, wherein a third diode is connected between the intermediate circuit capacitor and a junction point between the inductor and the second diode.

* * * * *